United States Patent [19]

Anderson et al.

[11] Patent Number: 5,096,486
[45] Date of Patent: Mar. 17, 1992

[54] TREATMENT OF METAL BEARING MINERAL MATERIAL

[75] Inventors: Corby G. Anderson, Silverton; Leo E. Krys, Kellogg, both of Id.; Kevin D. Harrison, Albuquerque, N. Mex.

[73] Assignee: Sunshine Precious Metals Incorporated, Boise, Id.

[21] Appl. No.: 627,061

[22] Filed: Dec. 13, 1990

[51] Int. Cl.$^5$ ................................. C22B 3/08
[52] U.S. Cl. ............................................ 75/734
[58] Field of Search .................... 75/734, 733; 423/27, 423/87, 109, 150, 658.5

[56] References Cited

U.S. PATENT DOCUMENTS

| | | |
|---|---|---|
| 52,834 | 2/1866 | Elward et al. |
| 176,813 | 5/1876 | Rogers |
| 287,737 | 10/1883 | Stetefeldt |
| 653,414 | 4/1900 | Fink |
| 814,294 | 3/1906 | Just |
| 820,000 | 5/1906 | Just |
| 899,146 | 9/1908 | Turton |
| 1,150,787 | 8/1915 | Rankin |
| 1,471,514 | 10/1923 | Elliott |
| 2,477,469 | 7/1949 | Thompson |
| 2,805,936 | 9/1957 | Schaufelberger |
| 2,835,569 | 5/1958 | Reynaud et al. |
| 2,959,467 | 11/1960 | Yusuf et al. |
| 3,107,977 | 10/1963 | Borvali et al. |
| 3,330,648 | 7/1967 | Vian-Ortuno |
| 3,793,429 | 2/1974 | Queneau et al. |
| 3,884,831 | 5/1975 | Bloom |
| 3,888,748 | 6/1975 | Brennecke |
| 3,902,896 | 9/1975 | Borbely et al. ...................... 75/733 |
| 3,910,636 | 10/1975 | Hard |
| 3,929,597 | 12/1975 | Cottam et al. |
| 3,933,478 | 1/1976 | Moore |
| 3,965,239 | 6/1976 | Posel |
| 3,988,415 | 10/1976 | Barr |
| 4,084,961 | 4/1978 | Caldon .................................. 75/734 |
| 4,189,461 | 2/1980 | Lueders et al. |
| 4,331,469 | 5/1982 | Kunda |
| 4,440,569 | 4/1984 | Weir et al. ............................ 75/734 |
| 4,647,307 | 3/1987 | Raudsepp et al. .................... 75/739 |

FOREIGN PATENT DOCUMENTS 596716  6/1988  Australia .

Primary Examiner—Melvyn J. Andrews
Attorney, Agent, or Firm—Haynes and Boone

[57] ABSTRACT

A process for extracting silver, copper, zinc, arsenic and iron from sulfide materials by leaching under relatively mild oxygen pressure and temperature conditions with sulfuric acid and sodium nitrite.

23 Claims, 2 Drawing Sheets

TREATMENT OF METAL BEARING MINERAL MATERIAL

BACKGROUND OF THE INVENTION

1. Field of the Invention

The present invention relates to the treatment of metal bearing mineral materials for the extraction of desired metal values, such as silver, copper, zinc, arsenic and iron. The treatment may be for direct recovery of the desired metal values and/or for the enrichment in the solids of other constituents such as lead, sulfur, antimony, bismuth and gold. More specifically, the present invention relates to the leaching of such metal bearing mineral materials with an aqueous liquid containing sodium nitrite.

2. Description of the Prior Art

Because of present day emphasis on minimizing pollution of the earth and the atmosphere and because of more acute awareness of energy conservation as an industrial reality, metal recovery processes which involve ore roasting techniques have become less desirable. As an alternative, the lixiviation or leaching of metal bearing mineral materials by hydrometallurgical techniques is considered more appropriate since roasting gases, in which pollutants such as sulfur dioxide predominate, are not normally formed.

For instance, techniques are known for extracting silver and copper from silver and copper bearing solids by hydrometallurgical techniques such as by utilizing pressure oxidation in a nitric/sulfuric acid environment. For instance, see U.S. Pat. No. 4,084,961 to Caldon.

However, even ore leaching techniques, as so far provided by the art, suffer from certain drawbacks. Among these is the attendant expensive consumption of leaching agents, especially acid and oxidant, i.e. where soluble salts are to be formed of the desired metal values by the action of an oxidizing acid, such as nitric acid, and oxygen on the metal bearing mineral material. In order to obtain more efficient recovery of some desired metal values, the ore is sometimes pretreated to remove unwanted constituents. Where such pretreatment involves roasting steps, the above stated disadvantages must be similarly considered. Where such pretreatment involves hydrometallurgical steps, expensive consumption of treatment agents and problems of their disposal are often involved which when added to the energy and equipment requirements significantly detract from the overall economy of the system used. Moreover, once the desired metal values have been leached from the mineral material, for instance by an acid leaching treatment, the metal values must be separately recovered and the remaining leaching solution containing acid values and perhaps residual metal values must be disposed of or regenerated for recycling. Such recovery and work up add to the overall treatment cost.

In particular, one obvious disadvantage of acid treating under pressure a metal containing material, whether sulfide, oxide or mixture, in which any of the desired metals are associated with carbonates, is the substantial pressure developed by the release of carbon dioxide gas. Carbon dioxide always develops in such instances where an acid reacts with a carbonate material. Very often metal mines yield ores, particularly those involving silver, copper, zinc, arsenic, iron, lead, sulfur, antimony, bismuth, gold, and the like, in which the valuable metals are associated geologically with manganese or iron carbonate. In the flotation treatment of these ores, metals combined as carbonates very often concentrate with the sulfide or oxide flotation product.

Hence, the treatment of such flotation concentrates or the like by acid leaching under oxygen pressure in closed pressure vessels results in the need for additional oxygen pressure sufficient to counterbalance the partial pressure generated by released carbon dioxide gas. The end result is more elaborate leaching equipment, slower reaction rates, incomplete leaching as well as increased consumption of acid.

In addition, rapid and exothermic reactions are experienced in the nitric/sulfuric acid pressure leaching process, making the process difficult to control on a large scale. Particularly troublesome are the pressure spikes associated with an overall pressure increase.

The present invention has been developed with a view to providing an improved process for extracting metal values from metal bearing mineral materials.

SUMMARY OF THE INVENTION

The present invention provides a process for the treatment of metal bearing mineral materials for the extraction therefrom of desired metal values, such as silver, copper, zinc, arsenic and iron. The process is particularly suitable for extracting silver from silver sulfide bearing solids. The process involves leaching a metal bearing mineral material with an aqueous liquid containing sodium nitrite.

According to the invention, the main leaching is carried out under relatively mild oxygen pressure and temperature conditions with an aqueous mixture of sulfuric acid and sodium nitrite. An optional acid pre-leaching step may be used to remove certain unwanted readily acid-leachable constituents, such as carbonate, which may be present in the core material without also prematurely leaching out the desired metal values to be recovered.

According to the invention, silver is recovered from the leaching solution by adding sodium chloride to the leaching solution to precipitate silver chloride and by contacting the silver chloride with zinc powder. Copper is recovered by conventional solvent extraction and electrowinning techniques. Extracted zinc can be recovered by conventional electrowinning technology. Solubilized arsenic and iron, which are largely removed to enhance later processing of unleached metal values, such as lead, sulfur, antimony, bismuth and gold, are precipitated with calcium hydroxide slurry.

Those skilled in the art will further appreciate the above described features of the present invention together with other superior aspects thereof upon reading the detailed description which follows.

DESCRIPTION OF THE PREFERRED EMBODIMENTS

Figure 1:
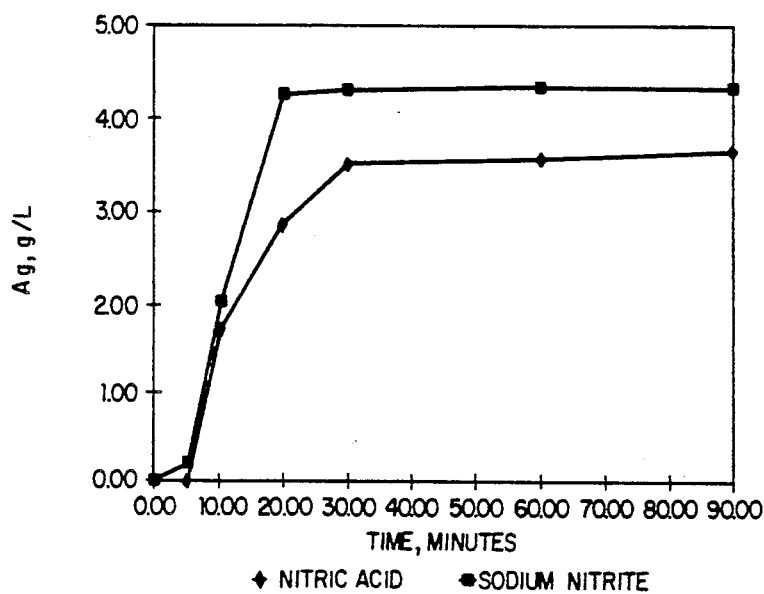
FIG. 1 is a graph of silver concentration versus time yielding a comparison of the rates of silver solubilization for equal amounts of sodium nitrite and nitric acid.

The present invention is directed to a process for the treatment of metal bearing mineral materials for the extraction therefrom of desired metal values, such as silver, copper, zinc, arsenic and iron. According to the process of the present invention, metal is pressure leached from metal sulfides under relatively mild oxygen pressure and temperature conditions with an aqueous mixture of sulfuric acid and sodium nitrite. The process is a nitrous/sulfuric acid pressure leach process and is an improvement over the nitric/sulfuric acid pressure leach process described in U.S. Pat. No. 4,084,961 to Caldon, the entire disclosure of which is hereby specifically incorporated herein by reference.

The nitrous/sulfuric acid pressure leach process of the present invention yields enhanced extraction of silver, copper, zinc, arsenic and iron and increased reaction rates when compared to a nitric/sulfuric acid pressure leach process. In addition, despite the increased reaction rate of the nitrous/sulfuric acid pressure leach process, a reduction in pressure takes place instead of a sharp pressure increase which is typically associated with the nitric/sulfuric acid pressure leach process for the extraction of metals.

PRESSURE LEACHING

According to the present invention, a process is provided for recovering acid leachable metal values from metal bearing mineral material solids which comprises pressure leaching such metal bearing mineral material solids with an aqueous liquid containing at least about 5.0 g/L, preferably, about 30 to about 225 g/L of sulfuric acid and about 0.1 to about 5.0 g/L, preferably, about 0.5 to about 4.0 g/L of sodium nitrite and water under oxygen pressure to dissolve such acid leachable metal values from said mineral material into the aqueous liquid. The aqueous liquid most preferably contains from about 160 to about 190 g/L of sulfuric acid. Generally, such pressure leaching is effected at a temperature of at least 20° C. for about 1 minute to about 4 hours, preferably, at a temperature of about 70° to about 160° C. for about 0.5 to about 4 hours, and most preferably at a temperature of about 125° to about 130° C. for about 1.5 hours.

Ore materials particularly applicable to treatment according to the present invention include, for example, milled ore concentrates obtained by flotation separation such as those containing one or more desired metals such as silver, copper, zinc, arsenic, iron, lead, sulfur, antimony, bismuth and gold, for instance in sulfide and/or oxide form, and in particular tetrahedrite type ores possibly including associated siderite therewith.

The pressure leaching is effected in a closed system, such as an autoclave, under an oxygen pressure of about 1 to about 130 psig (pounds per square inch gauge), preferably under an oxygen pressure of about 10 to about 50 psig and most preferably under an oxygen pressure of about 15 to about 40 psig in excess of autogenous steam pressure. As the artisan will appreciate, such oxygen pressure is a partial pressure or an overpressure, and in addition to the partial pressure of steam, represents the total pressure in the closed system generated under the temperature conditions involved. The oxygen used may be from any appropriate source.

Total leaching pressure, i.e. that created by the steam and oxygen has, has been found to be generally about 1 to about 130 psig, preferably about 10 to about 50 psig or most preferably about 15 to about 40 psig higher than that created by steam at the operating conditions. For instance, at 150° C., steam in a closed system exerts a pressure of approximately 55 psig. Thus, proper operating conditions for the pressure leach at about 150° C. would typically include a total pressure of about 90 psig. This would be made up of about 35 psig oxygen gas (oxygen overpressure) and 55 psig steam.

The contemplated free oxygen pressure or over-pressure is within the range of about 1 to 130 psig, preferably, 10 to about 50 psig and most preferably about 15 to about 40 psig. The free oxygen pressure is sufficient to provide a reasonably rapid rate of oxidation during the pressure leach. Excessive pressure and the need for elaborate high pressure equipment is not a concern according to the process of the present invention since pressure decreases rather than sharp pressure increases take place during the course of the nitrous/sulfuric acid pressure leach process. In general, the total pressure may be about 45 to about 140 psig, or about 50 to about 130 psig, of which about 10 to about 50 psig may be due to the oxygen overpressure. As the artisan will appreciate, the total pressure is a function of the chosen oxygen overpressure and maximum operating temperature.

For optimum metal recovery, especially silver recovery, the mineral material solids used for the pressure leaching step are sized so that approximately 80% of the solids have a Stokes diameter of 10 gm or less. In addition, the mineral material solids are generally present in the leach solution in an amount ranging between about 1 and about 60% by weight, and preferably between about 5 and about 20% by weight. This amount will be largely dictated by the amount of metal, particularly silver, in the material to be treated, and specifically the amount of reactive sulfide species which can be oxidized. Mineral materials containing little reactive sulfide content can be leached at a higher percent solids than those containing higher amounts of reactive sulfides.

With respect to the amount of sodium nitrite used, it will be seen that where sodium nitrite is deficient, the percentage of metal, particularly silver, dissolved during the pressure leaching is low. Naturally, all concentrates require slightly different amounts, but these will be within the very low sodium nitrite range noted above. Preferred are sodium nitrite concentrations at the middle of the stated range, e.g. concentrations of about 0.5 to about 4.0 g/L.

As to the sulfuric acid levels, the larger the amount of metal, particularly silver, especially where associated as sulfide, the more sulfuric acid is required. In any event, enough sulfuric acid within the stated ranges, generally in excess, is included in the system to provide the hydrogen ions needed to combine with the sulfides of the metals which are dissolved during the pressure leaching. Preferably, enough sulfuric acid is maintained in the leach to prevent the formation of arqentojarosite and plumbojarosite. This corresponds to an amount that will leave approximately 115 g/L of sulfuric acid in the aqueous liquid at the end of the leach.

In line with the foregoing, it will be realized that mineral materials containing no silver generally require less pressure, time and sulfuric acid for satisfactory pressure leaching. Sulfuric acid concentration may be varied generally inversely with the pressure leaching time, i.e. as the sulfuric acid concentration is reduced, the leaching time is generally lengthened. This observation applies generally where the free oxygen pressure in the range of about 1 to about 130 psig, preferably 10 to about 50 psig, and most preferably 15 to about 40 psig, is present, since this is sufficient to provide a reasonably rapid rate of oxidation.

The pressure leaching step of the invention is particularly desirably employed in treating silver bearing mineral material, especially tetrahedrite and the like, which may also contain copper, zinc, arsenic, iron, lead, sulfur, antimony, bismuth and gold. Moreover, by effecting the pressure leaching step at 140° C. with a total pressure of 90 psig, an approximate 92% or greater recovery of silver can be obtained. Recoveries of silver can reach 94% and above when the pressure leaching step is effected at 125° C. with a total pressure of 90 psig and when at least 80% of the solids have a Stokes diameter of 10 gm or less.

ACID PRETREATMENT

The metal bearing mineral material solids, e.q. mill concentrate or the like, optionally, may be subjected to an acid pretreatment step similar to that disclosed in U.S. Pat. No. 4,084,961 to Caldon. The acid pretreatment step is conducted by preliminary leaching with an aqueous liquid containing about 1 to 225 g/L of sulfuric acid in an open system or vessel at ambient or normal pressure. The acid pretreatment step serves to dissolve substantially the entirety of attendant acid soluble metal carbonate values from the mineral material prior to the main nitrous/sulfuric acid pressure leaching step.

The preliminary leaching step is generally at a temperature of about 20° to about 100° C. for about 0.5 to about 3.0 hours, preferably at a temperature of about 50° to about 100° C. for about 0.5 to about 2.0 hours, and most preferably at a temperature of about 90° to about 100° C. for about 1 hour. The time varies inversely with the temperature since the reaction rate generally increases as the temperature is increased.

The mineral material solids are generally present in the aqueous liquid used in the preliminary leaching step in an amount ranging between about 1 and about 60% by weight and preferably between about 5 and about 20% by weight. The percentage of solids will vary depending upon the amount of material present which will react with the acid under the particular reaction conditions selected and upon the ability of the aqueous liquid as a solvent to hold the reacted metal or metals in solution.

The sulfuric acid concentration range of about 1 to 225 g/L corresponds to an acid concentration of about 0.05–12.5% by weight of sulfuric acid.

Those of ordinary skill in the art will recognize that the preliminary leaching step may be by-passed where the flotation concentrate or the like to be subjected to pressure leaching does not contain carbonates or other undesired acid soluble metals under the acid pretreatment reaction conditions intended.

When the mineral material to be treated contains carbonates in prominent proportion, the acid pretreatment step will serve to decompose such carbonates, releasing their carbon dioxide content into the open system, such as the air over an open leaching vessel. In this manner, foaming and gassing from this source will be significantly avoided during the subsequent closed system pressure leaching step, since carbon dioxide present in perceptible quantities during the pressure leaching step drastically increases the reaction time. Nevertheless, under the mild temperature and normal atmospheric pressure conditions contemplated for the acid pretreatment step, silver, arsenic, lead, sulfur, bismuth and gold, which may be present in the ore material, are not dissolved out and only slight amounts of copper, zinc and antimony are leached along with the intended partial iron leaching.

POST-LEACH PROCESSING

In accordance with a further feature of the present invention, where the metal values are pressure leached from the metal bearing mineral material in the foregoing manner, the metal values can be further processed as follows. Specifically, after completion of the pressure leach step, a pregnant solution containing solubilized silver, copper, zinc, arsenic and iron is separated from solids enriched in lead, sulfur, antimony, bismuth and gold. The solids may be processed further to recover the enriched values by practices well established in the art such as pyrometallurgy, hydrometallurqy, screening and/or cyanidation.

The pregnant solution is selectively stripped of silver by a conventional process in which sodium chloride (NaCl) solution is added to the pregnant solution to precipitate silver chloride (AgCl) as follows:

$$Ag^+ + NaCl = AgCl(s) + Na^+ \qquad (1)$$

The solid AgCl precipitate is filtered from the pregnant solution, preferably washed thoroughly, and converted to elemental silver with zinc powder as follows:

$$2AgCl + Zn° = 2Ag° + ZnCl_2 \qquad (2)$$

Using conventional electrorefining techniques, the silver is further refined to a purity of 99.99%.

What remains of the pregnant solution contains considerable quantities of copper, zinc, arsenic, iron and free sulfuric acid. To save acid, a portion of this stream is recycled back to the leach area for make up solution. As it contains a significant amount of chloride ion due to silver stripping, it is cleaned up by conventional precipitation methods. This entails using some of the silver containing pregnant stream to react with the chloride ion in the recycle stream. Filtering of the contained solid AgCl leaves a liquid with a slight excess of silver in solution. This process ensures that no chloride ion is transferred to the stainless steel pressure leach vessels. This is important because there is a great potential for corrosion of this type of pressure vessel in chloride environments and it ensures that silver solubilization in leach will not be inhibited by AgCl precipitation.

The remaining portion containing the solubilized copper, zinc, arsenic, iron and free sulfuric acid is next treated for removal of copper. The first step is to remove much of the acidity by adding slaked lime. This raises the pH to about 2.0. The resulting slurry is subjected to liquid/solid separation. The resultant liquid is diluted and treated by conventional solvent extraction techniques such as with Acorga ® reagent commercially available from ICI to concentrate the copper in a separate stream from the arsenic, zinc and iron. This copper stream is further treated by conventional electrowinning techniques to produce high grade copper metal.

The stream containing significant quantities of zinc, arsenic, and iron (and lessened amounts of copper) may then be processed for zinc recovery by conventional solvent extraction and electrowinning processes, as well as by conventional impurity cementation and electrowinning processes resulting in a zinc metal product.

Finally, the stream containing significant levels of arsenic and iron (and lessened amounts of zinc and copper) resulting from upstream silver, copper and zinc recovery processing, can be treated to remove the arsenic and iron from solution. On a plant scale, this is done by adding slaked lime until the pH of the stream ranges from 8.0 to 9.0. This precipitates the arsenic and iron resulting in an environmentally stable solid residue containing arsenic, iron, zinc and copper as solids and an environmentally safe effluent, with low levels of solubilized copper, zinc, arsenic and iron.

The present invention will now be described in more detail with reference to the following examples. The following examples, however, are merely illustrative of the present invention and are not intended to be limiting.

EXAMPLE 2

A pressure leach experiment was conducted in which sodium nitrite ($NaNO_2$) was substituted for nitric acid ($HNO_3$) to assess what effect the substitution would have on silver recovery from a silver containing material.

In a standard nitric/sulfuric acid leach, 10 ml of 70% by weight $HNO_3$ was added for each experiment. The substitution of $NaNO_2$ for $HNO_3$ was done on an equivalent nitrogen atom basis. Thus 10.92 grams of $NaNO_2$ was used for a nitrous/sulfuric acid leach, based on the following stoichiometric conversion:

10 ml $HNO_3 \times 1.41$ g/ml = 14.1 g 14.1 g $\times 0.70 = 9.87$ g $NHO_3$ $HNO_3$ nitrogen content = 14/63 = 0.2222

$NaNO_2$ nitrogen content = 14/69 = 0.2029

Thus: $(9.87 \times 0.2222)/0.2029 = 10.81$ g $NaNO_2$
Since the purity is only 99.0% then
$10.81/0.99 = 10.92$ g $NaNO_2$ According to an acid pretreatment step, 551.47 grams of a homogeneous sample of metal bearing mineral material solids were mixed into a solution containing 600 ml. of 96.5% sulfuric acid (H ) or 1065.94 grams of $H_2SO_4$ (10.86 mol), 50.0 grams of ferric sulfate ($Fe_2(SO_4)_3$) (0.12 mol), 325.0 grams of cupric sulfate ($CuSO_4$) (2.04 mol) and sufficient water to bring the total slurry volume up to 5.0 liters. The resulting slurry was heated to a temperature of between 90° and 105° C. and was held at this temperature and agitated by dual props spinning at 1000 RPM in an open autoclave at ambient pressure for a period of 1 hours.

After the acid pretreatment step the autoclave was closed and charged with 90 psig oxygen. At the beginning of the pressure leach, 10.92 grams of $NaNO_2$ (0.16 mol) were dissolved in water and added to the slurry under oxygen pressure. The contents in the closed system were kept at a temperature no higher than 140° C. and agitated at 1000 RPM with constant addition of oxygen to maintain 90 psig total pressure within the autoclave. After leaching for 90 minutes under such temperature and pressure conditions, the pressure vessel was discharged, and the reaction products were separated and analyzed. Silver recovery was found to be 92.05%.

In the standard nitric/sulfuric acid leach in which 10 ml of 70% by weight $HNO_3$ (0.16 mol) replaced the 10.92 grams of $NaNO_2$ and in which all other conditions, including the amount, nature and content of the metal bearing mineral material solids, were identical, the recovery of silver was approximately 81%.

Thus, under identical conditions, the nitrous/sulfuric acid process of the present invention yields enhanced silver recovery when compared to a nitric/sulfuric acid process

EXAMPLE 2

A pressure leach experiment was conducted in which half as much $NaNO_2$ in terms of nitrogen content was substituted for $HNO_3$ to assess what effect the substitution would have on silver recovery from a silver containing material.

Based on the stoichiometric conversion set forth in Example 1, 5.46 grams of $NaNO_2$ (0.08 mol) were used for the nitrous/sulfuric acid leach of this example.

The acid pretreatment and pressure leach conditions as set forth in Example 1 were used for this experiment, except that 556.48 grams of a homogeneous sample of metal bearing mineral material solids were mixed into the slurry containing sulfuric acid, ferric sulfate, cupric sulfate and water.

At the beginning of the pressure leach, 5.46 grams of $NaNO_2$ (0.08 mol) were dissolved in water and added to the slurry under oxygen pressure. After 90 minutes of reaction, the pressure vessel was discharged, and reaction products were separated and analyzed. Silver recovery was found to be 91.36%.

In the standard leach in which 10 ml of 70% by weight $HNO_3$ (0.16 mol) replaced the 5.46 grams of $NaNO_2$ and in which all other conditions were identical, including the amount, nature and content of the metal bearing mineral material solids, the recovery of silver was approximately 81%. Accordingly, the nitrous/sulfuric acid process of the present invention yields enhanced silver recovery when compared to a nitric/sulfuric acid process even when half as much $NaNO_2$ as $HNO_3$, in terms of nitrogen content, is used.

EXAMPLE 3

Pressure leach experiments were conducted to compare the reaction rates and recoveries of metals using equivalent amounts of $HNO_3$ and $NaNO_3$. The comparison was conducted by collecting samples from a pressure leach vessel on a timed basis. This procedure enabled a comparison of reaction rates for each oxidizing species.

Figure 2:
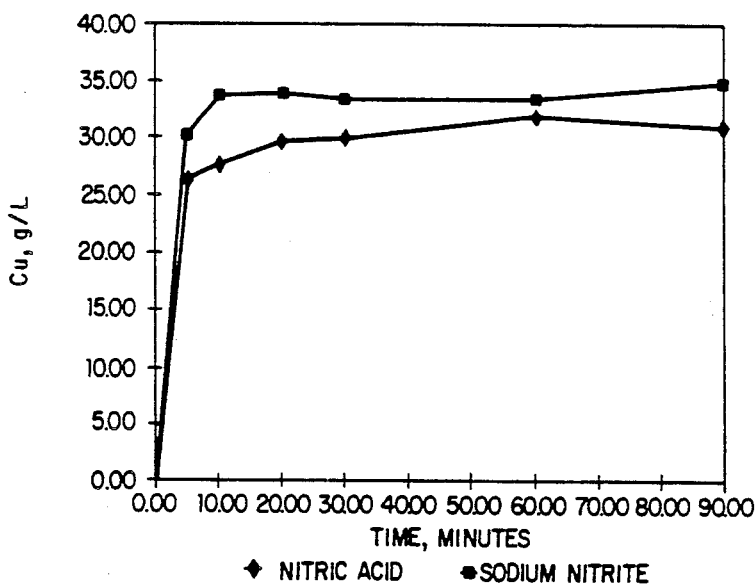
FIG. 2 is a graph of copper concentration versus time yielding a comparison of the rates of copper solubilization for equal amounts of sodium nitrite and nitric acid.
Figure 3:
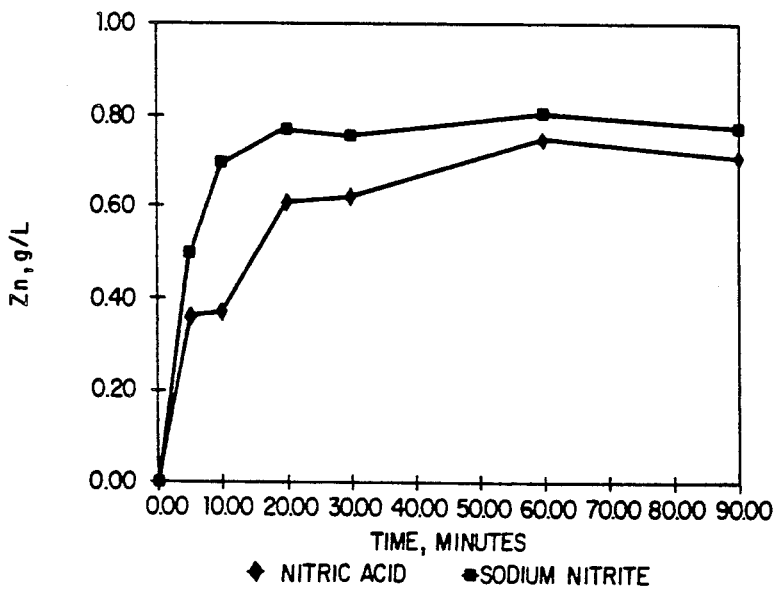
FIG. 3 is a graph of zinc concentration versus time yielding a comparison of the rates of zinc solubilization for equal amounts of sodium nitrite and nitric acid.
Figure 4:
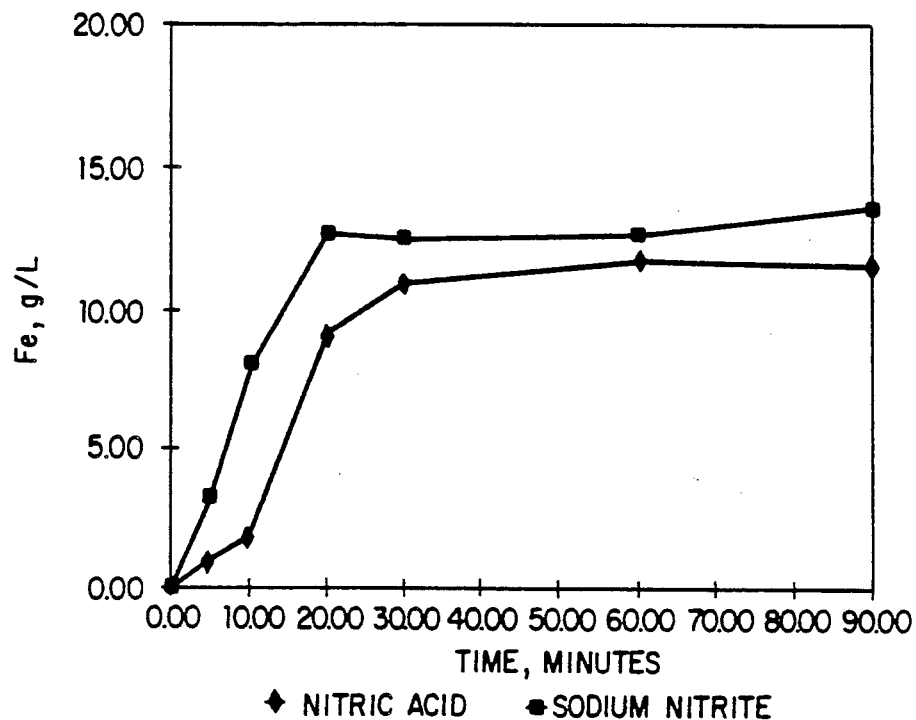
FIG. 4 is a graph of iron concentration versus time yielding a comparison of the rates of iron solubilization for equal amounts of sodium nitrite and nitric acid.
Figure 5:
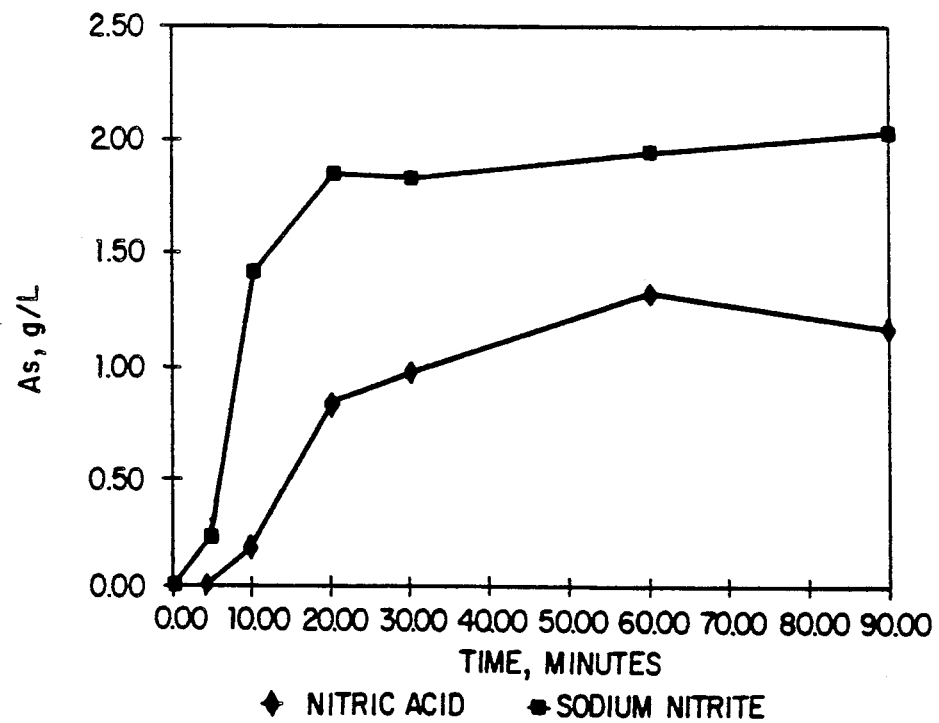
FIG. 5 is a graph of arsenic concentration versus time yielding a comparison of the rates of arsenic solubilization for equal amounts of sodium nitrite and nitric acid.

Two consecutive pressure leaches were run under identical conditions on the same amount, nature and content of homogeneous metal bearing mineral material solids containing equivalent amounts of silver, copper, zinc, arsenic and iron in which only the oxidizer type was changed. The results of these tests are graphically depicted in FIGS. 1 through 5. As can be seen, $NaNO_2$ yields a higher reaction rate and a higher overall extraction of silver, copper, zinc, arsenic and iron when compared to $HNO_3$ on an equivalent nitrogen atom basis.

Again, equivalent amounts of $HNO_3$ and $NaNO_2$ were charged in a pressure vessel for the respective experiments based on the stoichiometric conversion set forth in Example 1.

The acid pretreatment and pressure leach conditions as set forth in Example 1 were used for this experiment except that the first test utilized 547.38 grams of homogeneous metal bearing solids while the second test utilized 553.15 grams of homogeneous metal bearing solids.

At the beginning of the pressure leach for the first test, 10.92 grams of $NaNO_2$ (0.16 mol) was dissolved in water and added under oxygen pressure. Samples of the reacting slurry were withdrawn at 0, 5, 10, 20, 30, 60, and 90 minutes. After 90 minutes of reaction, the pressure vessel was discharged, and the reaction products were separated and analyzed.

At the beginning of the pressure leach for the second test, 10.0 ml of 70% by weight $HNO_3$ (0.16 mol) was dissolved in water and added under oxygen pressure. Again, timed samples were taken. As shown in FIGS. 1 through 5, the results when using the $NaNO_2$ are much better.

EXAMPLE 4

According to this experiment, 567.86 grams of a homogeneous sample of metal bearing mineral material solids in which at least 80% of the solids had a Stokes diameter of 10 μm or less were mixed into a solution containing 710 ml of 96.5% $H_2SO_4$, 500.0 grams of ferric sulfate, 325.0 grams of cupric sulfate and sufficient water to bring the total slurry volume up to 5.0 liters. The resulting slurry was heated to a temperature of between 90 and 105° C. and was held at this temperature and agitated by dual props spinning at 1200 RPM in an open autoclave at ambient pressure for a period of 1 hour.

After the acid pretreatment step the autoclave was closed and charged with 90 psig oxygen. At the beginning of the pressure leach, 16.5 grams of $NaNO_2$ were dissolved in water and added to the slurry under oxygen pressure. The autoclave heating setpoint was set to 120° C. and the contents in the closed system were kept at a temperature no higher than 125° C. and agitated at 1200 RPM with constant addition of oxygen to maintain a 90 psig total pressure within the autoclave. Leaching was continued for 90 minutes at a temperature no higher than 125° C. under such pressure conditions. After 90 minutes of reaction, the pressure vessel was discharged, and the reaction products were separated and analyzed. Silver recovery was found to be 94.36%.

Although preferred embodiments of the present invention have been described in some detail herein, various substitutions and modifications may be made to the compositions of the invention without departing from the spirit and scope of the appended claims.

What is claimed is:

1. A process, comprising:
pressure leaching metal bearing mineral material solids with an aqueous liquid comprising at least about 5.0 g/L of sulfuric acid and about 0.1 to about 5.0 g/L of sodium nitrite under oxygen pressure.

2. A process according to claim 1 wherein said aqueous liquid comprises about 30 to about 225 g/L of sulfuric acid.

3. A process according to claim 2 wherein said aqueous liquid comprises about 160 to about 190 g/L of sulfuric acid.

4. A process according to claim 1 wherein said aqueous liquid comprises about 0.5 to about 4.0 g/L of sodium nitrite.

5. A process according to claim 1 wherein said pressure leaching is effected at a temperature of at least about 20° C.

6. A process according to claim 5 wherein said pressure leaching is effected at a temperature of about 70° to about 160° C.

7. A process according to claim 6 wherein said pressure leaching is effected at a temperature of about 12.5° to about 130° C.

8. A process according to claim 1 wherein said pressure leaching is conducted for about 1.0 minutes to about 4.0 hours.

9. A process according to claim 8 wherein said pressure leaching is conducted for about 0.5 to about 4.0 hours.

10. A process according to claim 9 wherein said pressure leaching is conducted for about 1.5 hours.

11. A process according to claim 1 wherein said pressure leaching is conducted in a closed system under an oxygen pressure of about 1 to about 130 psig in excess of autogenous steam pressure.

12. A process according to claim 11 wherein said pressure leaching is conducted in a closed system under an oxygen pressure of about 10 to about 50 psig in excess of autogenous steam pressure.

13. A process according to claim 12 wherein said pressure leaching is conducted in a closed system under an oxygen pressure of about 15 to about 40 psig in excess of autogenous steam pressure.

14. A process according to claim 1 wherein about 80% of said metal bearing mineral material solids have a Stokes diameter of 10 gm or less.

15. A process according to claim 1 wherein said metal bearing mineral material solids comprise between about 1 and about 60% by weight of said aqueous liquid.

16. A process according to claim 15 wherein said metal bearing mineral material solids comprise between about 5 and about 20% by weight of said aqueous liquid.

17. A process according to claim 1 wherein said metal bearing mineral material solids comprise one or more metals selected from the group consisting of silver, copper, zinc, arsenic, iron, lead, antimony, bismuth and gold and sulfides oxides or mixed sulfides and oxides thereof and wherein metal values are pressure leached therefrom.

18. A process according to claim 1 wherein aid metal bearing mineral material solids are acid pretreated mineral material solids from which acid soluble metal carbonates have been removed by acid pretreatment.

19. A process according to claim 18 wherein said mineral material solids comprise tetrahedrite.

20. A process according to claim 1 wherein aid metal bearing mineral material solids as acid pretreated by preliminary leaching with an aqueous liquid containing about 1.0–225 g/L sulfuric acid in an open system at ambient pressure.

21. A process according to claim 20 wherein said preliminary leaching is effected at about 20 to about 100° C. for about 0.5 to about 3.0 hours and said metal bearing mineral material solids comprise about 1 to about 60% by weight of said aqueous liquid.

22. A process according to claim 1 wherein said metal bearing mineral material solids are silver bearing mineral material solids and silver values are pressure leached therefrom, wherein sodium chloride is added to the aqueous liquid containing the silver values pressure leached from said mineral material solids to precipitate silver chloride therefrom, and wherein said precipitated silver chloride is contacted with zinc powder to yield silver metal and zinc chloride.

23. A process, comprising:
(a) preliminary leaching metal bearing mineral material solids with an aqueous liquid containing about 1.0 to 225 g/L of sulfuric acid at a temperature of from 20 to 100° C. for about 0.5 to about 3.0 hours in a vessel open to ambient pressure; and
(b) pressure leaching said metal bearing mineral material solids in a closed vessel with an aqueous liquid comprising about 30 to about 225 g/L of sulfuric acid and about 0.1 to about 5.0 g/L of sodium nitrite under an oxygen pressure of 1 to about 130 psig in excess of autogenous steam pressure at a temperature of from 70 to about 160° C. for about 1.0 minute to about 4.0 hours.

* * * * *

UNITED STATES PATENT AND TRADEMARK OFFICE
CERTIFICATE OF CORRECTION

PATENT NO. : 5,096,486
DATED : March 17, 1992
INVENTOR(S) : Corby G. Anderson et al.

It is certified that error appears in the above-identified patent and that said Letters Patent is hereby corrected as shown below:

Column 1, line 56, change "work up" to -- work-up --.

Column 2, line 52, change "above described" to -- above-described --.

Column 4, line 33, change "10 gm" to -- 10 µm --.

Column 5, line 21, change "10 gm" to -- 10 µm --.

Column 5, line 35, after "generally" insert -- effected --.

Column 7, line 23, change "EXAMPLE 2" to -- EXAMPLE 1 --.

Column 7, line 50, change "(H)" to --($H_2SO_4$) --.

Column 7, line 58, change "hours" to -- hour --.

Column 10, line 11, change "12.5°" to -- 125° --.

Column 10, line 35, change "10 gm" to -- 10 µm --.

Column 10, line 46, change "sulfides" to -- sulfides, --.

Column 10, line 49, change "aid" to -- said --.

Column 10, line 55, change "aid" to -- said --.

Column 10, line 56, change "as" to -- are --.

Signed and Sealed this

Twenty-first Day of September, 1993

Attest:

BRUCE LEHMAN

*Attesting Officer*  *Commissioner of Patents and Trademarks*